(12) United States Patent
Cromp et al.

(10) Patent No.: US 7,783,782 B2
(45) Date of Patent: Aug. 24, 2010

(54) DYNAMIC RUNTIME SERVICE ORIENTED ARCHITECTURE

(75) Inventors: Robert F. Cromp, Clifton, VA (US); James A. Wren, Fallston, MD (US)

(73) Assignee: Raytheon Company, Waltham, MA (US)

( * ) Notice: Subject to any disclaimer, the term of this patent is extended or adjusted under 35 U.S.C. 154(b) by 150 days.

(21) Appl. No.: 12/126,580

(22) Filed: May 23, 2008

(65) Prior Publication Data

US 2009/0292797 A1  Nov. 26, 2009

(51) Int. Cl.
*G06F 15/16* (2006.01)
(52) U.S. Cl. ........................... 709/249; 709/250
(58) Field of Classification Search .............. 709/203, 709/217–219, 249, 250
See application file for complete search history.

(56) References Cited

U.S. PATENT DOCUMENTS

| 7,386,620 | B2* | 6/2008 | Lei et al. ............... 709/229 |
| 7,496,637 | B2* | 2/2009 | Han et al. .............. 709/217 |
| 7,580,989 | B2* | 8/2009 | Reeves et al. .......... 709/217 |
| 2004/0220910 | A1* | 11/2004 | Zang et al. ............... 707/3 |
| 2008/0140759 | A1* | 6/2008 | Conner et al. .......... 709/201 |

\* cited by examiner

*Primary Examiner*—Yemane Mesfin
(74) *Attorney, Agent, or Firm*—Baker Botts L.L.P.

(57) ABSTRACT

According to one embodiment, a dynamic access method for a service oriented architecture includes receiving a number of proxy endpoints from a business application, selecting one proxy endpoint from among the multiple proxy endpoints, and transmitting a request to an enterprise service bus (ESB). The request includes the one proxy endpoint for accessing the particular web service that it references.

21 Claims, 4 Drawing Sheets

```
static void Main (string[] args)
{
    //create a proxy for the registry of Web Services and Service Interfaces
    DiscoveryServices.ServiceDiscoveryService service =
        new DiscoveryServices.ServiceDiscoveryService();

//Create a proxy for the interface ITime.
    //The proxy was generated at design time
    ITime.ITime itime = new DiscoveryServiceExample.ITime.ITime();

//Get all services that implement ITime.
    //An Endpoint wraps the service name and WSDL Url.
    DiscoveryServices.Endpoint[] endpointArray =
        service.getServices("ITime");

//Loop through the Endpoints
    foreach (DiscoveryServices. Endpoint endpoint in endpointArray)
    {
        //Change the Url of the interface so it points to a WebService.
        itime.Url = endpoint.WsdlUrl;

//Call the Web Service through the instantiated Service Interface
        Console.WriteLine(itime.getTime());
    }
}
```

*FIG. 3*

DYNAMIC RUNTIME SERVICE ORIENTED ARCHITECTURE

TECHNICAL FIELD OF THE DISCLOSURE

This disclosure generally relates to computer architectures, and more particularly, to a dynamic runtime service oriented architecture (SOA) and a method for accessing web services from the same.

BACKGROUND OF THE DISCLOSURE

Computing systems having a service oriented architecture (SOA) process business applications using multiple web services. Web services are typically provided by computing nodes configured in a distributed computing system. These web services may be relatively modular for use by various types of business applications. Differing types of business applications may be generated by invoking various combinations of web services, which may enhance reuse of existing software.

SUMMARY OF THE DISCLOSURE

According to one embodiment, a dynamic access method for a service oriented architecture includes receiving a number of proxy endpoints from a business application, selecting one proxy endpoint from among the multiple proxy endpoints, and transmitting a request to an enterprise service bus (ESB). The request includes the one proxy endpoint for accessing the particular web service that it references.

Some embodiments of the invention provide technical advantages. For example, according to one embodiment, the dynamic runtime service oriented architecture may provide a relatively secure environment for dynamically accessing web services from a publicly available network, such as the Internet. The dynamic runtime service oriented architecture incorporates an internal UDDI registry that restricts access to interfaces and web services that meet a specified policy. In this manner, only those proxy endpoints of approved web services are selected for use. Thus, business applications may safely select from among a number of proxy endpoints for execution in a relatively efficient manner.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which:

FIG. 3 is a source listing showing an example portion of a particular business application that may be used with the dynamic runtime service oriented architecture of FIG. 1.

DETAILED DESCRIPTION OF EXAMPLE EMBODIMENTS

Distributed computing describes an architectural style in which applications may be executed on multiple computers. Distributed computing systems may provide relatively efficient use of computing resources by distributing processing load to multiple computers that are coupled together through a network. A service oriented architecture (SOA) is a particular type of architecture that may be incorporated on a distributed computing system. Computing systems implementing a service oriented architecture use small portions of executable software referred to as web services that perform a specified task or function. These multiple services may be executed in an organized manner to provide a business application.

Distributed computing systems incorporating a service oriented architecture are often implemented on publicly available networks, such as the Internet. Public networks allow various providers to generate web services and advertise these web services for use by others. To provide a common protocol for the advertisement and consumption of web services, the web services description language (WSDL) has been developed. The web services description language generally includes an XML-based model specifying various characteristics and/or functions provided by its one or more web services.

Distributed computing systems implementing a service oriented architecture may provide relatively efficient functionality. In one aspect, web services generally include relatively small snippets of software code that may be reused by differing types of business applications. The reliability of service oriented architectures may suffer, however, due to the generally unrestricted nature of publicly available networks. For example, business applications may utilize web services that are exposed for use by other organizations in which no control over their reliability or accessibility is maintained. Thus the reliability of the business application may be contingent upon the reliability of the constituent web services used. Business applications using a service oriented architecture may also be susceptible to malicious attacks by simply corrupting web services that may be manipulated by legitimate web service providers as well as illegitimate web service providers.

Figure 1:
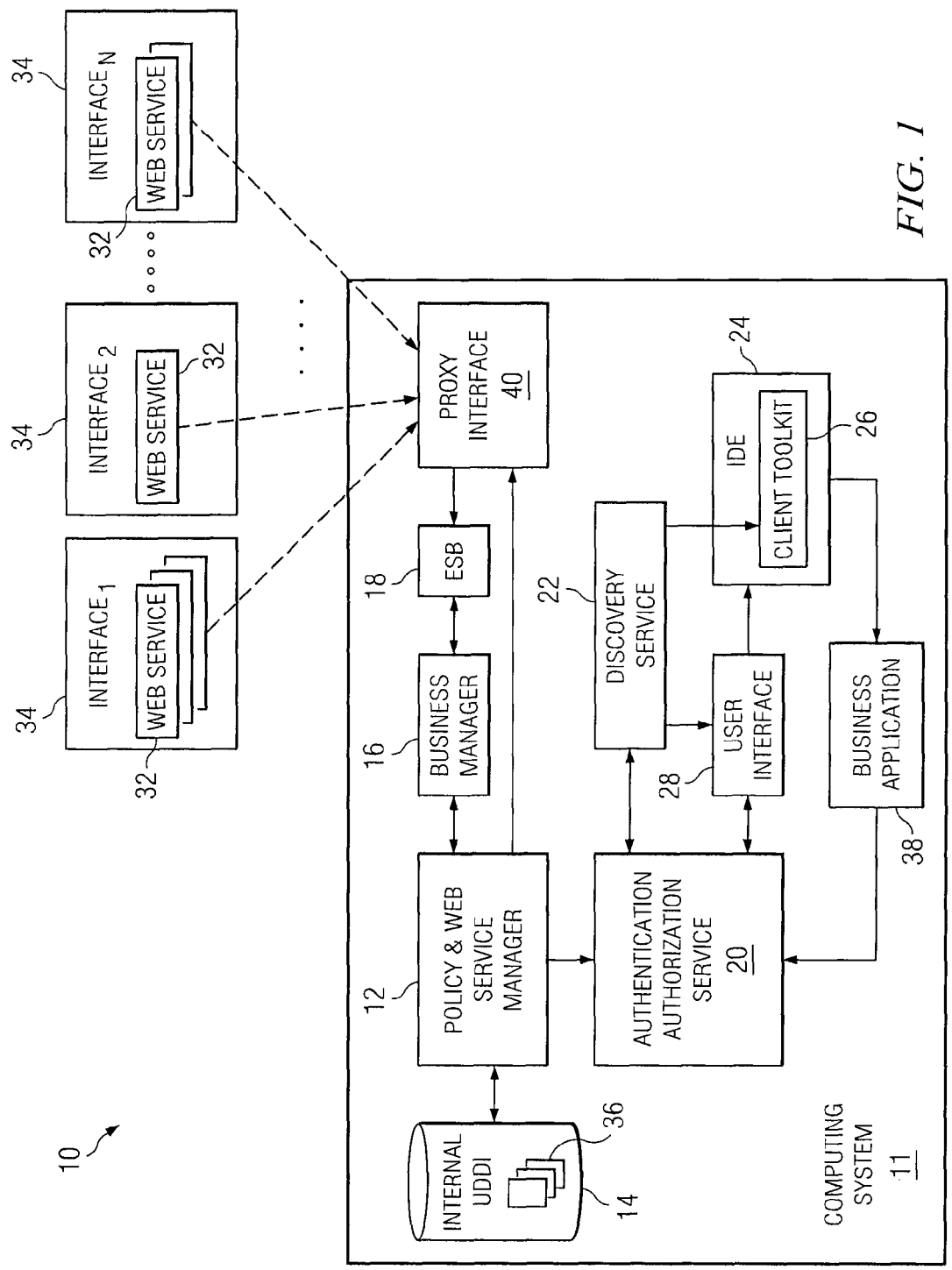
FIG. 1 is a block diagram showing one embodiment of a dynamic runtime service oriented architecture according to the teachings of the present disclosure.

FIG. 1 shows one embodiment of a dynamic runtime service oriented architecture 10 that may provide a solution to these problems as well as other problems. Dynamic runtime service oriented architecture 10 includes a computing system 11 executing a policy and web service manager 12, an internal UDDI registry 14, a business manager 16, an enterprise service bus 18, an authentication and authorization service 20, a discovery service 22, an integrated development environment (IDE) application 24 executing a client toolkit 26, and a user interface 28 coupled together as shown. Dynamic runtime service oriented architecture 10 communicates with web services 32 that may support one or more interfaces 34. Policy and web service manager 12 stores proxy endpoints 36 to certain web services 32 in UDDI registry 14. Integrated development environment application 24 uses client toolkit 26 to generate a business application 38 that when executed, generates a request for a list of proxy endpoints 36 that satisfy a specified interface 34. Business application 38 include selection criteria for selecting one proxy endpoint 36 from among multiple proxy endpoints 36 corresponding to multiple web services 32 that implement the specified interface 34. Once selected, the proxy endpoint 36 is transmitted to enterprise service bus 18 for execution of web service 32 associated with proxy endpoint 36.

Certain embodiments may provide a system for dynamically executing business application 38 by alternatively selecting from among multiple similar web services 32 at runtime. That is, a particular seb service 32 may be selected for execution based upon prevailing conditions in existence at the time in which business application 38 is executed. In publicly accessible networks, such as the Internet, web services 32 may experience differing levels of performance over time. According to the teachings of the present disclosure, business application 38 may include selection criteria embedded in its software code to alternatively select a particular web service 32 that implements the interface 34 based upon its measured reliability and/or performance at runtime.

Certain embodiments may also provide for execution of business application 38 in a dynamic runtime service oriented architecture 10 with a relatively high degree of reliability and/or integrity. Interfaces 34 and web services 32 used by business application 38 are restricted to those conforming to policies stored in policy and web service manager 12, the operation of which is described in greater detail below. Thus, selection from among a number of alternative web services 32 may be limited to those web services 32 having a specified level of reliability and/or integrity. Confidentiality may also be provided by authentication and authorization service 20 that selectively limits access to interfaces 34 and web services 32 to users having authorization to access such interfaces 34 and web services 32.

Business application 38 includes logic that is executed by a suitable processor and stored in a computer-readable medium, such as a random access memory (RAM) and/or non-volatile storage, such as a magnetic hard disk. In one embodiment, business application 38 may include selection criteria that retrieves one or more characteristics of web services 32 and selects a particular web service 32 based upon the received characteristics.

Authentication and authorization service 20 authenticates users of dynamic runtime service oriented architecture 10. Users may include developers who write business application 38 and users who may execute business application 38. Authentication and authorization service 20 ensures the identity of users logged in through user interface 28 and permits use of interfaces 34 according to the user's authorization level. Authentication and authorization service 20 may include logic that is received from business application 38 and operable to be executed by a suitable processor for alternatively selecting one web service 32 from among a number of web services 32 according to selection criteria received from business application 38.

In a particular example, several web services 32 are associated with several communication satellites that may be alternatively used as a communications link. At any given point in time, business application 38 may be executed on a portable platform, such as a vehicle, that may use any of these communication links. Business application 38 may include selection criteria, such as s geographic location, a bit transfer rate or quality of service (QoS) metric, that may be used by proxy interface 40 to retrieve associated characteristics of each web service 32 and select a particular web service 32 based upon these retrieved characteristics. In another embodiment, business application 38 may include software code for determining characteristics for each web service 32. One example may include a business application 38 having software code that instructs proxy interface 40 to ping each web service 32 and measure the time required for a response. Based upon its response time, proxy interface 40 may select a particular web service 32 for use.

Policy and web service manager 12 manages access to interfaces 34 and web services 32 by ensuring that applicable policies are satisfied before a user can access an interface 34 and/or its associated web services 32. Attempts to access interfaces 34 or web services 32 in which these policies are violated causes the request to be denied and an error message returned to the business application 38. The specified policy used by policy and web service manager 12 may include any suitable criteria for ensuring the privacy, integrity, and/or reliability of interfaces 34 or web services 32. For example, as part of a governance plan, policy and web service manager 12 may verify that all methods of interfaces 34 are provided by any web services 32 registered as an implementation of any interface 34.

As another example, only web services 32 from trusted interfaces 34 may have their proxy endpoints 36 stored in internal UDDI registry 14. Proxy endpoints 36 may be added or deleted from UDDI registry 14 in any suitable manner. In one embodiment, proxy endpoints 36 may be manually edited or deleted from internal UDDI registry 14.

In one embodiment, internal UDDI registry 14 includes a table that maps proxy endpoints 36 to web services 32, the operation of which may be automated as part of a governance process. At run time, the Authentication and Authorization Service 20 uses the Policy and Web Service Manager 12 to ensure that Business Application 38 is authorized to use the web service 32 or interface 34 identified through its indirect reference to a particular proxy endpoint 36. If this access is granted, then Policy and Web Service Manager 12 provides the corresponding proxy endpoint 36 to the web service 32, which is then invoked automatically by the Authentication and Authorization Service 20. Business Application 38 is not able to access this web service endpoing 36 directly, thus providing a level of security and control to the Service Oriented Architecture 10 and providers of the web services 32.

Proxy endpoints 36 used by proxy interface 40 are restricted to those stored in internal UDDI registry 14. Thus, proxy endpoints 36 passed to enterprise service bus 18 through proxy interface 40 includes only those that meet the applicable policies of policy and web service manager 12. In this manner, policy and web service manager 12 serves as a policy decision point (PDP) and proxy interface 40 serves as a policy enforcement point (PEP). As will be described below, policy and web service manager 12 stores authorization information with proxy endpoints 36 to limit use of interfaces 34 and web services 32 to users having a sufficient authorization level. In one embodiment, policy and web service manager 12 may also limit use of interfaces 34 and web services 32 that meet established service level agreements with the provider of a particular web service 32.

Dynamic runtime service oriented architecture 10 implements a service oriented architecture (SOA) using enterprise service bus 18. Enterprise service bus 18 orchestrates multiple web services 32 together to execute business application 38. Web services 32 may be executed on individual computers that are coupled together over a network. In some cases, performance characteristics of web services 32 may be provided by enterprise service bus 18. Monitored characteristics of web services 32 may include response latency time, average data throughput, minimum data throughput, and other quality of service (QoS) metrics. In one embodiment, additional monitored characteristics for a web service 32 can be registered and queried as established in the interface 34 for that web service 32. In one embodiment, proxy endpoint 40 receives selection criteria from business application 38 in which these characteristics are used to select an appropriate web service 32.

Business manager 16 may be included to manage various accounting parameters of interfaces 34 consumed by business application 38. Business manager 16 may store the number of times and/or duration in which particular methods of interfaces 34 or specific web services 32 are consumed. Business manager 16 may also store performance characteristics of particular interfaces 34 for web services 32, such as those described above.

Discovery service 22 and client toolkit 26 facilitate creation of business application 38. Discovery service 22 searches for proxy endpoints 36 stored in internal UDDI registry 14 according to the authorization level of users logged in through user interface 28. Those proxy endpoints 36 having a sufficient authorization level may be available for use. Client toolkit 26 is executed within integrated desktop environment application 24 for integrating indirect references proxy endpoints 36 in business application 38. Client toolkit 26 aids development of business application 38 by placing indirect reference to proxy endpoints 36 and references to discovery service 22 in a form suitable for execution within business application 38.

Computing system 11 may include any suitable type of computing system having one or more processors executing instructions stored in a memory. Computing system 11 may comprise a distributed computing system or a stand-alone computing system. In one embodiment, a stand-alone computer system may be any suitable computing system, such as a personal computer, laptop computer, or mainframe computer. In another embodiment, computing system 11 configured as a distributed computing system may include a number of computer systems coupled together via a network, such as a local area network (LAN), a metropolitan area network (MAN), or a wide area network (WAN). Computing system 11 configured as a distributed computing system may utilize web services 32 provided by differing organizations over a publicly accessible network, such as the Internet.

Figure 2:
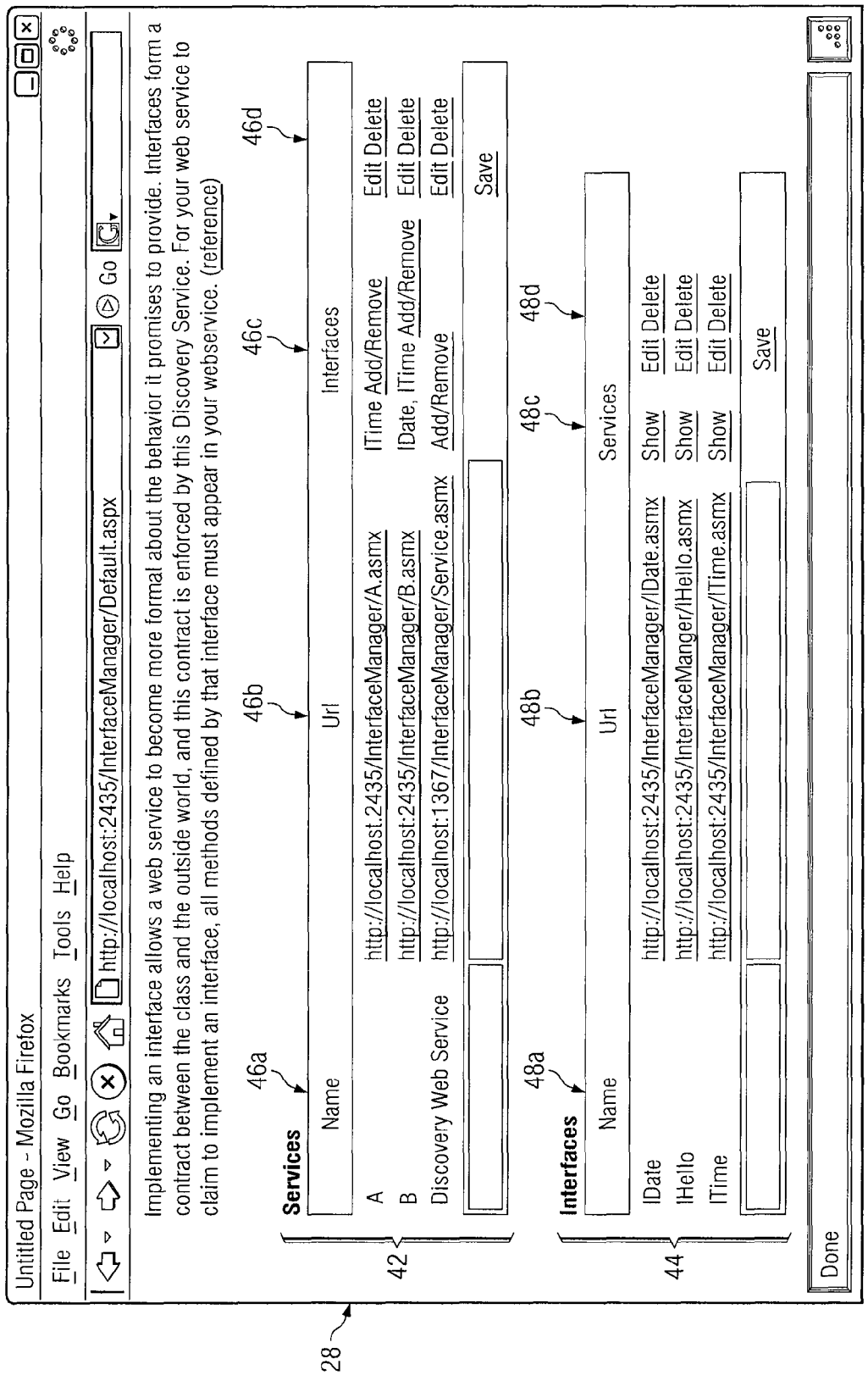
FIG. 2 is a screenshot showing one embodiment of a user interface that may be used with the dynamic runtime service oriented architecture of FIG. 1.

FIG. 2 is a screenshot showing one embodiment of a user interface 28 that may be provided by dynamic runtime service oriented architecture 10. In this particular embodiment, user interface 28 is implemented as a dynamically generated webpage executed on a web browser, however, any suitable type of user interface may be used. User interface 28 has a services widget 42 and a interfaces widget 44. Services widget 42 displays a list of web services 32 along with their interfaces 34 in which their associated proxy endpoints 36 are stored in internal UDDI registry 14. Services widget 42 includes a name field 46a, a URL field 46b, an interfaces field 46c, and an edit/deletion field 46d. The URL field 46b provides a universal resource locater (URL) associated with each web service 32 as described in name field 46a. Interface field 46c displays various interfaces 34 that may be available from its associated web service 32. Edit/deletion field 46d provides interactive edits and/or deletion of its associated web service 32 through user interface 28.

Interface widget 44 displays a list of interfaces 34 associated with web services 32 displayed in services widget 42. Interface widget 44 includes a name field 48a, a URL field 48b, a services field 48c, and an edit/deletion field 48d. URL field 48b displays, in hypertext link form, the universal resource locater associated with the name of interface 34 in interface field 48a. Services field 48c includes a hypertext link that may be selected to display its associated web service 32 on user interface 28. Edit/deletion field 48d provides interactive editing and/or deletion of proxy endpoints 36 associated with interfaces 34 from internal UDDI registry 14.

User interface 28 may be coupled to policy and web service manager 12 for managing proxy endpoints 36 stored in internal UDDI registry 14. User interface 28 may also be coupled to integrated development environment application 24 and/or authentication and authorization service 20 for writing or executing business application 38. The types of web services 32 and associated interfaces 34 displayed are generally dependent upon the authorization level of the user logged on to user interface 28. For example, a user may log on with administrator privileges when coupled to policy and web service manager 12 for managing particular web services 32 and associated interfaces 34 associated with proxy endpoints 36 stored in internal UDDI registry 14.

FIG. 3 shows a portion of an example business application 38 that may be generated and/or executed through user interface 28. This portion of business application 38 shows a function 50 having an object-oriented format, however, any format using any suitable language may be used with the teachings of the present disclosure. Function 50 includes a number of code segments 52a, 52b, 52c, and 52d. Code segment 52a instantiates an object that facilitates interaction with discovery service 22, and code segment 52b instantiates a reference to proxy interface 40, which in this case, is a pre-existing ITime interface. Code segment 52c uses the object instantiated by code segment 52a to retrieve an array of web service virtual endpoints associated with the "ITime" interface 34. Code segment 52d loops through the array of indirect references to proxy endpoints 36 to retrieve information about each web service 32 that implements the ITime interface 34.

Function 50 shows one particular example software function for accessing web services 32 for a given interface 34 in a service oriented architecture; however, other techniques for selectively accessing web services 32 are possible. Function 50 may include other code segments (not shown) to select one particular web service 32 based upon its characteristics, such as its measured quality of service (QoS) and/or bit transfer rate. Thus, the performance of business application 38 may be enhanced by dynamically selecting particular web services 32 for use at runtime according to their characteristics in some embodiments.

Figure 4:
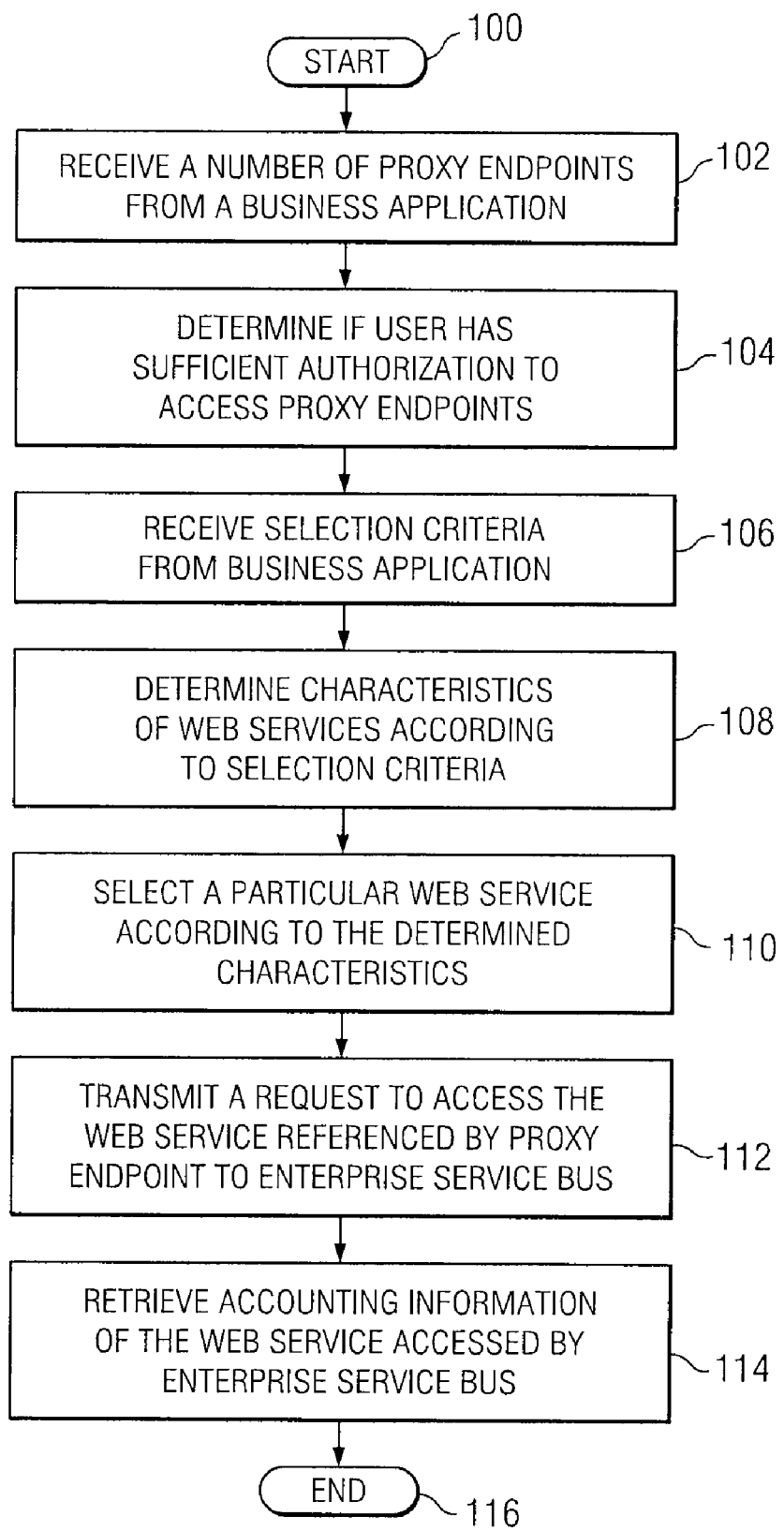
FIG. 4 is a flowchart showing one embodiment of a series of actions that may be performed by the dynamic runtime service oriented architecture of FIG. 1 to dynamically access web services that implement a given interface.

FIG. 4 shows one embodiment of a series of actions that may be performed by dynamic runtime service oriented architecture 10 to invoke a web service 32 from among a plurality of web services 32 from business application 38. In act 100, the process is initiated. The process may be initiated by executing business application 38 on computing system 11.

In act 102, authentication and authorization service 20 receives a number of alternative proxy endpoints from business application 38. Proxy endpoints are limited to those stored in internal UDDI registry 14 and thus meeting a specified policy. In this manner, the reliability and/or integrity of web services 32 accessed by dynamic runtime service oriented architecture 10 may be maintained at an acceptable level. In one embodiment, business application 38 is written using a client toolkit 26 executed in integrated developer environment application 24. In some embodiments, client toolkit 26 may aid development of business application 38 by applying coding rules used by policy and web service manager 12 for execution during runtime.

In act 104, policy and web service manager 12 determines if the user of business application 38 has sufficient access authorization for each proxy endpoint. In one embodiment, determination of access authorization may be provided by authentication and authorization service 20 that verifies the identity of the user of business application 38 and associates a particular authorization level with the identified user. If one or more proxy endpoints exceeds the authorization level of the user, these proxy endpoints are not used.

In act 106, selection criteria are received from business application 38. Selection criteria may be communicated from business application 38 as extensible markup language (XML) based messages and transferred to proxy interface 40 during runtime. Selection criteria may include any suitable characteristics of interfaces 34 that may be used to determine a particular web service 32 for use. Examples of selection criteria may include, for example, references to specific properties defined in the interface 34 and supported by web services 32 that implement the interface 34, or general accounting information about service level agreements maintained by business manager 16 about any of the web services 32. Specific examples might include geographic location, a bit transfer rate, quality of service (QoS), response latency time, average data throughput, and/or minimum data throughput of the particular web service 32. From the received selection criteria, characteristics of web services 32 are determined in act 108.

In act 110, a particular proxy endpoint from among the number of proxy endpoint is selected for use. Selection of a proxy endpoint may be accomplished using any suitable approach. For example, a particular web service 32 may be selected according to a measured average data throughput value. As another example, a particular web service 32 may be selected according to a measured response time in which ping messages are transmitted to each web service 32 associated with proxy endpoint and their response times measured. The web service 32 exhibiting the shortest time for response may then be selected.

In act 112, authentication and authorization service 20 transmits a request to enterprise service bus 18 to access the web service 32 referenced by the proxy endpoint. The enterprise service bus 18 accesses the web service 32, and facilitates communicating results back to business application 38 through a standard series of call-backs.

In act 114, policy and web service manager 12 may receive accounting information associated with the consumed web service 32 from the enterprise service bus 18. Accounting information may include any business information, such as quality of service (QoS) metrics or billing information associated with the selected web service 32. In one embodiment, accounting information may be managed by a business manager 16 that monitors usage of various web services 32 and their associated interfaces 34.

The previously described process is repeated for other groups of alternative web services 32 specified in business application 38. When execution of business application 38 is no longer needed or desired, the process is halted in act 116.

Modifications, additions, or omissions may be made to the previously described method without departing from the scope of the present disclosure. The method may include more, fewer, or other acts. For example, business application 38 may include code segments 52 that describe selection of a particular web service 32 based upon differing types or instances of enterprise service buses 18 used. Differing versions of enterprise service buses may access web services 32 in a slightly different manner. Thus, business application 38 may include conditional statements that alternatively select a suitable web service 32 according to the type and/or version of enterprise service bus used.

Although several embodiments have been illustrated and described in detail, it will be recognized that substitutions and alterations are possible without departing from the spirit and scope of the present disclosure, as defined by the following claims.

What is claimed is:

1. A dynamic access method for a service oriented architecture comprising:
   receiving a plurality of proxy endpoints from a business application, each of the plurality of proxy endpoints referencing each of a plurality of web services;
   determining whether the business application is authorized to use the plurality of web services;
   receiving one or more selection criteria from the business application, the selection criteria being associated with one or more characteristics of each of the plurality of web services;
   determining one or more characteristics of each of the web services according to the one or more selection criteria;
   selecting, according to the one or more characteristics, one proxy endpoint from among the plurality of proxy endpoints;
   transmitting a request including the one proxy endpoint to an enterprise service bus, the enterprise service bus operable to invoke the one web service pointed to by the one proxy endpoint;
   providing, through the enterprise service bus, indirect communications from the one web service pointed to by the one proxy endpoint to the business application; and
   preventing the business application from directly accessing the plurality of web services without communicating through the enterprise service bus.

2. The dynamic access method of claim 1, wherein the one or more characteristics are selected from the group consisting of a geographic location, a bit transfer rate, a quality of service (QoS), a response latency time, an average data throughput, and a minimum data throughput.

3. The dynamic access method of claim 1, further comprising restricting the plurality of proxy endpoints to those that conform to a specified policy.

4. The dynamic access method of claim 3, further comprising storing authorization information with each proxy endpoint in an internal UDDI registry, the authorization information describing an authorization level of each of a plurality of users.

5. The dynamic access method of claim 1, further comprising discovering the plurality of proxy endpoints from an internal UDDI registry and integrating, by a client toolkit, the plurality of proxy endpoints into the business application.

6. The dynamic access method of claim 5, further comprising restricting display of the plurality of proxy endpoints to those having sufficient authorization, the plurality of proxy endpoints being displayed on a user interface.

7. The dynamic access method of claim 1, further comprising receiving accounting information from the enterprise service bus and storing the accounting information in an internal UDDI registry.

8. Code embodied on a non-transitory computer-readable medium, when executed by a computer operable to perform at least the following:
   receive a plurality of proxy endpoints from a business application, each of the plurality of proxy endpoints referencing each of a plurality of web services;
   determine whether the business application is authorized to use the plurality of web services;
   receive one or more selection criteria from the business application, the selection criteria being associated with one or more characteristics of each of the plurality of web services;
   determine one or more characteristics of each of the web services according to the one or more selection criteria;

select, according to the one or more characteristics, one proxy endpoint from among the plurality of proxy endpoints;

transmit a request including the one proxy endpoint to an enterprise service bus, the enterprise service bus operable to invoke the one web service pointed to by the one proxy endpoint;

provide, through the enterprise service bus, indirect communications from the one web service pointed to by the one proxy endpoint to the business application; and prevent the business application from directly accessing the plurality of web services without communicating through the enterprise service bus.

9. The code of claim 8, wherein the one or more characteristics are selected from the group consisting of a geographical location, a bit transfer rate, a quality of service (QoS), a response latency time, an average data throughput, and a minimum data throughput.

10. The code of claim 8, further operable to restrict the plurality of proxy endpoints to those that conform to a specified policy.

11. The code of claim 10, further operable to store authorization information with each proxy endpoint in an internal UDDI registry, the authorization information describing an authorization level of each of a plurality of users.

12. The code of claim 8, further operable to discover the plurality of proxy endpoints from an internal UDDI registry and integrate, by a client toolkit, the plurality of proxy endpoints into the business application.

13. The code of claim 12, further operable to restrict display of the plurality of proxy endpoints to those having sufficient authorization, the plurality of proxy endpoints being displayed on a user interface.

14. The code of claim 8, further operable to receive accounting information from the enterprise service bus and store the accounting information in an internal UDDI registry.

15. A system comprising:
a processor; and
computer readable memory encoded with logic that when executed by the processor is operable to:
receive a plurality of proxy endpoints from a business application, each of the plurality of proxy endpoints referencing each of a plurality of web services;
determine whether the business application is authorized to use the plurality of web services;
receive one or more selection criteria from the business application, the selection criteria being associated with one or more characteristics of each of the plurality of interfaces;
determine one or more characteristics of each of the interfaces according to the one or more selection criteria;
select, according to the one or more characteristics, one proxy endpoint from among the plurality of proxy endpoints;
transmit a request including the one proxy endpoint to an enterprise service bus to invoke the one web service pointed to by the one proxy endpoint;
provide, through the enterprise service bus, indirect communications from the one web service pointed to by the one proxy endpoint to the business application; and
prevent the business application from directly accessing the plurality of web services without communicating through the enterprise service bus.

16. The system of claim 15, wherein the one or more characteristics are selected from the group consisting of a geographical location, a bit transfer rate, a quality of service (QoS), a response latency time, an average data throughput, and a minimum data throughput.

17. The system of claim 15, further comprising a policy and web service manager coupled to an internal UDDI registry for storage of the plurality of proxy endpoints, the policy and web service manager operable to restrict storage of the plurality of proxy endpoints whose associated interfaces conform to a specified policy.

18. The system of claim 17, wherein the policy and web service manager is operable to store authorization information with each web service in the internal UDDI registry, the authorization information describing an authorization level of each of a plurality of users.

19. The system of claim 15, further comprising a client toolkit coupled to a discovery service, the client toolkit executed in a integrated development environment application and operable to receive the plurality of proxy endpoints discovered by the discovery service and integrate the proxy endpoints into the business application.

20. The system of claim 19, further comprising a user interface, the authentication and authorization service operable to restrict display of the plurality of proxy endpoints on the user interface to those having sufficient authorization.

21. The system of claim 15, further comprising a business manager coupled to the authentication and authorization service and the enterprise service bus, the business manager operable to receive accounting information associated with the one web service from the enterprise service bus and store the accounting information in an internal UDDI registry.

* * * * *